United States Patent [19]

Wellinga et al.

[11] Patent Number: 4,828,864

[45] Date of Patent: May 9, 1989

[54] FILLING MASS COMPOSITION FOR BAKERY PRODUCTS

[75] Inventors: Peter Wellinga, Tiel; Jongchol Kim, Wageningen, both of Netherlands

[73] Assignee: Nestec S.A., Vevey, Switzerland

[21] Appl. No.: 788,828

[22] Filed: Oct. 18, 1985

[30] Foreign Application Priority Data

Oct. 26, 1984 [NL] Netherlands .................. 8403261

[51] Int. Cl.$^4$ ............... A21D 10/00; A23L 1/216
[52] U.S. Cl. .................. 426/550; 426/637; 426/653
[58] Field of Search ............ 426/637, 653, 658, 550

[56] References Cited

U.S. PATENT DOCUMENTS

| | | | |
|---|---|---|---|
| 3,057,732 | 10/1962 | Conrad et al. | 426/637 X |
| 3,067,042 | 12/1962 | Pader. | |
| 3,260,607 | 7/1966 | Asselbergs et al. | |
| 3,275,458 | 9/1966 | Willard. | |
| 3,418,142 | 12/1968 | Willard. | |
| 3,753,735 | 8/1973 | Gerkens | 426/550 X |
| 3,764,344 | 10/1973 | Glabe et al. | 426/637 X |
| 4,455,321 | 6/1984 | Glabe et al. | 426/637 X |

FOREIGN PATENT DOCUMENTS 1395884  5/1975  United Kingdom.
2111816  7/1983  United Kingdom .............. 426/637

OTHER PUBLICATIONS

A. M. Cooley, et al., "Studies on Dehydrated Potato Granules", Food Technology, May 1954, pp. 263-269.
Drazga, et al., "Storage Properties of Potato Flakelets", Food Technology, 1964, vol. 18, No. 8, pp. 91-94.
Eskew, et al., "Potato Flakelets—A New Dense Product from Flakes", Food Technology, vol. 16, No. 4, 1962, pp. 99-101.
Talburt, et al., *Potato Processing*, 3rd Ed. (Avi Publishing Co. Inc.) 1975, pp. 20-23.
Eskew, et al., "Potate Flakes v. Potato Flakes of Increased Density", ARS 73-30, Sep. 1960, Agricultural Research Service, U.S. Dept. of Agriculture, pp. 2-20.
Mullins, et al., "Estimation of Free Starch in Potato Granules and its Relation to Consistency of Reconsituted Product", Food Technology, Aug. 1955, vol. 9, No. 8, pp. 393-395.

*Primary Examiner*—Arthur L. Corbin
*Attorney, Agent, or Firm*—Vogt & O'Donnell

[57] ABSTRACT

A powder suitable for the manufacture of a filling mass for bakery products comprising 15 to 25 parts of potato granules, 3 to 5 parts of fat, 3 to 6.5 parts of thickening agents and optionally 45 to 58 parts of sugar.

11 Claims, No Drawings

FILLING MASS COMPOSITION FOR BAKERY PRODUCTS

The present invention relates to a powder suitable for the manufacture of a filling mass for bakery products, the filling mass itself and a process for manufacturing it.

A prior free-flowing powder suitable for the preparation of filling masses to be used in bakery products has been proposed in Great Britain Patent Specification No. 1 395 884, which comprises mainly soya meal, pregelatinised starch and castor sugar beside small amounts of triglyceride, thickening agents, flavours, colouring matter and preservatives. This prior powder, with sufficient water added to get a plastic filling mass, was intended to be a substitute for a commercially available filling mass essentially based on white beans. Said prior powder, however, failed to have the expected success in replacing said commercially available filling mass. Thus, there is still a need for a substitute for a commercially available filling mass essentially based on white beans.

Accordingly, it is an object of the present invention to provide a substitute for said commercially available filling masses. It is another object of this invention to provide a substitute based on raw materials which are not expensive.

To this end, the present powder suitable for the manufacture of a filling mass for bakery products comprises, by weight, 15 to 25 parts of potato granules, 3 to 5 parts of fat and 3 to 6.5 parts of one or more thickening agents. Preferably, the present powder further comprises 45 to 58 parts by weight of sugar.

The present filling mass for bakery products comprises, by weight, 15 to 25 parts of potato granules, 3 to 5 parts of fat, 3 to 6.5 parts of one or more thickening agents, 17 to 21 parts of water and 45 to 58 parts of sugar.

The present process for manufacturing a filling mass for bakery products comprises incorporating potato granules into the filling mass in an amount such that 89.5 to 93.5% by weight of the mass consists of said potato granules, water and sugar, the remainder of the mass comprising fat and thickening agents. Preferably, the present process comprises the steps of mixing together, the parts being by weight, 15 to 25 parts of potato granules, 3 to 5 parts of fat, 3 to 6.5 parts of one or more thickening agents and 17 to 21 parts of water, allowing the mixture to rest for 20 to 40 min and kneading the mixture with 45 to 58 parts of sugar.

It was surprisingly found that white beans may be entirely and successfully replaced by potato granules in the manufacture of filling masses for bakery products.

Potato granules suitable for the present products and process may be obtained by a so called "add-back" process in which potatoes are cooked, mashed, partially dried by mixing with recycled dried granules and dried to the desired final moisture content.

Similarly, in the present products and process, a suitable sugar may be an ordinary granulated sugar, preferably castor sugar. A suitable fat may be any edible liquid fat at room temperature, especially a vegetable oil such as soy oil. Suitable thickening agents may be a pregelatinized starch or natural or synthetic gums, especially pregelatinized wheat starch and/or pregelatinized waxy rice starch. Other ingredients which may be used in the present products and process are e.g. flavourings and colouring matters, although they are not indispensable because the present powders and filling mass have a pleasant bland taste and a natural slightly yellow colour.

Especially good results may be obtained when using, in the present products and process, potato granules produced by an add-back process having a blue value index between 0 and 0.15. The blue value index is determined in the present context according to the following procedure:

(1) Add 5.00 g of product to 500 ml of distilled water heated to 65° C.
(2) Stir for 5 min in such a way that the product remains just in suspension.
(3) Filter 150 ml of the suspension through a folded paper filter and discard the first 50 ml of filtrate.
(4) Add 10 ml of filtrate to 39 ml of distilled water and 1 ml of 0.02N iodine solution.
(5) Standardize the photometer with 1 ml of 0.02N iodine solution in 49 ml of distilled water.
(6) Measure the extinction with the photometer at 670 nm; the extinction value obtained in this way is defined as the blue value index.

The present powder suitable for the manufacture of a filling mass for bakery products may be provided with or without sugar, depending on the shelf life which the filling mass should have. If a long shelf life is not required, the powder may already comprise the sugar. If a long shelf life of at least three months is required, the powder should not comprise the sugar. To produce a filling mass with a long shelf life, all the ingredients, except sugar, should be mixed with water and the mixture allowed to rest for about half an hour before kneading it with the sugar.

Thus, a first type of the present powder, with sugar, is for household purposes, where a long shelf life of the filling mass is not required. Another type, without sugar, is for the production of filling masses with a long shelf life comparable with that of the filling masses based on white beans, that is to say for the manufacture of filling masses for bakeries.

The present powders and filling mass comprise 15 to 25 parts by weight of potato granules. If granules are not used but, e.g., potato flakes are used, too much water is necessary for manufacturing the filling mass and it is not keepable, needs to be baked longer, it collapses when it is cooled down and does not have a satisfactory texture, which should be short and not gluey, namely like an almond paste. If less than 15 parts of potato granules are used, the filling mass will be too sweet, its baking properties are not good and it has no texture, namely it is like a sugar syrup. If more than 25 parts of potato granules are used, the fresh manufactured filling mass may be good, but it does not keep well.

The present powders and filling mass also comprise 3 to 6.5 parts by weight of one or more thickening agents, preferably pregelatinized starch or natural or synthetic gums. With less than 3 parts of thickening agents, the texture of the filling mass will be too loose; it has no bite. With more than 6.5 parts of thickening agents, the texture of the filling mass becomes too tough and gummy.

The 3 to 5 parts by weight of fat act as a tenderizing agent in the manufacture of the filling mass. With less than 3 parts of fat, the filling mass is too hard. With more than 5 parts of fat; its baking properties are bad, it does not rise.

As already disclosed above, the 45 to 58 parts by weight of sugar may consist of ordinary granulated sugar, for example, castor sugar. It is not necessary to add any coarser or less soluble sugar in order to obtain the wanted texture of the filling mass. If less than 45 parts of the sugar are used in its manufacture, the filling mass will not keep well. With more than 58 parts of sugar, the filling mass will become dry and hard because of sugar recrystallisation.

The present invention will be illustrated in the following examples in which all parts or percentages are by weight. If not stated otherwise, the potato granules used in the various examples were obtained by an addback process and had a blue value index of 0.085. Similarly, the pregelatinized starch consisted of 50% pregelatinized wheat starch and 50% pregelatinized waxy rice starch. The percentages indicated in parentheses after the respective amounts in g of the different ingredients used were calculated with respect to the total weight of the filling mass which was made of or was to be made of these amounts of ingredients. The extrudability of the filling masses was checked with an ordinary household piping bag.

EXAMPLE 1

A powder made of 80 g (22.25%) of potato granules, 18 g (5.01%) of pregelatinized starch and 14.5 g (4.03%) of soy oil was mixed intimately with 67 g (18.64%) of water. The mixture was allowed to rest for 30 min and was then kneaded with 180 g (50.07%) of castor sugar.

The fresh filling mass for bakery products obtained in this way was well extrudable. It had a pleasant slightly yellow colour and a pleasant bland taste. Its texture was short, not gluey and very similar to the texture of alomond paste. None of these characteristics were lost after 120 days' storage at 18° C.

In order to assess its baking properties and its eating properties after baking, the filling mass was used in tarts which were prepared in the following way. Firstly, the tart dough was prepared by mixing:

| wheat flour | 4500 parts |
| margarine | 2420 parts |
| castor sugar | 2250 parts |
| water | 450 parts |
| sodium hydrogen carbonate | 45 parts |
| disodium pyrophosphate | 45 parts |

Then the dough was rolled out to a thickness of about 2.5 mm. Discs having a diameter of about 80 mm were cut out from the sheet of dough. About 30 g of filling mass were deposited on one disc of dough. The filling mass was covered with another disc of dough which was then glazed with homogenized whole egg. The tarts were baked for 10 min at 240° C.

Shape, colour, structure and taste of the tarts one day after baking were good and comparable with those of tarts prepared from a commercially available filling mass essentially based on white beans.

Sample tarts were packed in a cellophane foil and stored for 30 days at 20° C. The organoleptic and eating properties of the tarts after this storage test were nearly as good as those of the fresh tarts.

EXAMPLE 2

A powder made of the same amounts in g of potato granules, pregelatinized starch and soy oil as the powder of Example 1 as mixed with 75 g of water. The mixture was then treated in the same way as the mixture of Example 1.

As compared with the filling mass of Example 1, the filling mass obtained in this way was thinner but still easily extrudable. Its colour, taste and texture were nearly as good in the fresh state and after 120 days' storage at 18° C. Also its chewing properties when used in tarts were as good after 1 day and after 30 days.

EXAMPLE 3

Two filling masses were manufactured and tested in the same way as the filling mass of Example 1, with the sole exception that the potato granules used in the first had a blue value index of 0.02 and the potato granules used in the second had a blue value index of 0.135 instead of 0.085.

The two filling masses obtained in this way were good and acceptable respectively, as compared with the filling mass of example 1, alone and when used in tarts.

EXAMPLE 4

A powder made of 80 g (22.25%) of potato granules, 18 g (5.01%) of pregelatinized starch, 14.5 g (4.03%) of soy oil and 180 g (50.07%) of castor sugar was mixed and kneaded with 67 g (18.64%) of water.

While the filling mass obtained in this way was as good as the filling mass of Example 1 in the fresh state it did not keep well and got hard after a few weeks' storage at 18° C. When used in tarts in the fresh state, its eating properties were as good after 1 day but no longer acceptable after 30 days.

EXAMPLES 5 TO 11

Powders comprising different amounts of potato granules, pregelatinized starch and soy oil were mixed with different amounts of water, allowed to rest for 30 min and kneaded with different amounts of sugar. Their extrudability in the fresh state and after 120 days' storage at 18° C. as well as their eating properties after 1 day when used in tarts were tested in the way disclosed in Example 1. The compositions of the different powders and filling masses and the results of the tests are summarised in the following table.

| | Example No. | | | | | | | | | | | | | |
|---|---|---|---|---|---|---|---|---|---|---|---|---|---|---|
| | 5 | | 6 | | 7 | | 8 | | 9 | | 10 | | 11 | |
| | Composition | | | | | | | | | | | | | |
| | g | % | g | % | g | % | g | % | g | % | g | % | g | % |
| Potato granules | 73 | 21.01 | 80 | 21.50 | 80 | 23.06 | 80 | 20.23 | 80 | 18.50 | 80 | 17.11 | 80 | 24.4 |
| pregelatinized starch | 18 | 5.18 | 23.5 | 6.32 | 11.5 | 3.31 | 18 | 4.55 | 18 | 4.16 | 18 | 3.85 | 18 | 5.50 |
| soy oil | 14.5 | 4.17 | 14.5 | 3.90 | 14.5 | 4.18 | 14.5 | 3.67 | 14.5 | 3.35 | 14.5 | 3.10 | 14.5 | 4.43 |
| water | 62 | 17.84 | 74 | 19.89 | 61 | 17.58 | 74 | 18.71 | 81 | 18.73 | 87 | 18.61 | 64 | 19.54 |
| castor sugar | 180 | 51.80 | 180 | 48.39 | 180 | 51.87 | 209 | 52.84 | 239 | 55.26 | 268 | 57.33 | 151 | 46.11 |

-continued

| | Example No. | | | | | | | | | | | | | |
|---|---|---|---|---|---|---|---|---|---|---|---|---|---|---|
| | 5 | | 6 | | 7 | | 8 | | 9 | | 10 | | 11 | |
| | Composition | | | | | | | | | | | | | |
| | g | % | g | % | g | % | g | % | g | % | g | % | g | % |
| extrudability (fresh state) | good | | good | | good | | good | | good | | good | | good | |
| extrudability (after 120 days) | reasonable | | just acceptable | | just acceptable | | just acceptable | | fairly good | | fairly good | | unacceptable | |
| eating properties in tarts after 1 day | reasonable | | fairly good | | fairly good | | good | | reasonable | | just acceptable | | reasonable | |

Example 5 shows another rather well balanced composition. Examples 6 and 7 illustrate the fact that the content in pregelatinized starch could really be varied within the prescribed range while still leading to an adequate filling mass. Examples 8, 9 and 10 illustrate the fact that a progressively increased sugar content had a more and more negative influence on the eating properties of the tarts after one day. Example 11 shows that a markedly high content in potato starch granules leads to a filling mass which was still good but of which the keepability was not.

COMPARATIVE EXAMPLES

Examples IV and XVII of Great Britain Patent Specification No. 1 395 884 were repeated in order to compare the organoleptic properties, the extrudability and the eating properties in tarts of these prior filling masses with the properties of the present filling masses. It was noticed that the filling mass according to said example IV had a sticky texture, that is to say a homogeneous, smooth, pudding-like consistency. The filling mass according to said Example XVII had a better texture, but was still too sticky. The flavour was not to be compared with the flavour of the present filling masses because of the necessarily strong soy taste.

We claim:

1. A filling mass composition for bakery products which consists essentially of, by weight, 15 to 25 parts of potato granules, 3 to 5 parts of fat and 3 to 6.5 parts of at least one thickening agent.

2. A composition according to claim 1 which further consists essentially of 45 to 58 parts by weight of sugar.

3. A composition according to claim 2 which further consists essentially of 17 to 21 parts by weight of water.

4. A composition according to claim 1 or 2 or 3 wherein the potato granules have a blue value index of between 0 and 0.15.

5. A composition according to claim 2 or 3 wherein the sugar is castor sugar.

6. A composition according to claim 1 or 2 or 3 wherein the fat is a vegetable oil.

7. A composition according to claim 6 wherein the vegetable oil is soy oil.

8. A composition according to claim 1 or 2 or 3 wherein the thickening agent is selected from the group consisting of pregelatinized starch, natural gums, synthetic gums and combinations thereof.

9. A composition according to claim 8 wherein the pregelatinized starch is selected from the group consisting of pregelatinized wheat starch and pregelatinized waxy rice starch and combinations thereof.

10. A composition according to claim 4 wherein the fat is a vegetable oil.

11. A composition according to claim 10 wherein the vegetable oil is soy oil.

* * * * *